Patented June 30, 1942

2,288,497

UNITED STATES PATENT OFFICE 2,288,497

CONCENTRATION OF POTASH ORES

Francis X. Tartaron, Allen T. Cole, and James B. Duke, Mulberry, Fla., assignors to Phosphate Recovery Corporation, New York, N. Y., a corporation of Delaware No Drawing. Application June 18, 1941, Serial No. 398,570

16 Claims. (Cl. 209—49)

This invention relates to the concentration of sylvinite ores of the type found in the Carlsbad district of New Mexico. More particularly, the invention relates to improved methods of effecting the separation of the desired sylvite from such ores by froth-flotation and agglomeration tabling operations with the use of appropriate agents which result in the separation of the desired constituent of the ore from the other constituents of the ore.

This application is a continuation in part of our application Ser. No. 384,354.

The general objects of the invention are to produce concentrates of the desired sylvite which are of high commercial grade, with high percentages of recovery, with economy in the use of agents, and with reliable and easily controlled operation of the plant. These objects are attained by the processes embodying the present invention which are hereinafter described.

The methods of the present invention are the result of the discovery that greatly improved results, as to grade and recovery of the desired potash minerals and as to control of operations, can be obtained by the use, in conjunction with agents which act as collectors in concentration of such minerals, of an auxiliary agent consisting of an aqueous solution containing starch. A simple solution or suspension of starch in water, however, does not seem to be effective in our process, and we find it advisable to treat the starch in such a manner as to rupture the outer coating of the starch grains and liberate the material within the grains. This material is presumably amylose; and it appears probable that it is the amylose that is responsible for the improved results obtained by the process of our invention. However, the invention does not depend on the correctness of this theory, and our process may be carried out with any starch, the grains of which have been so treated as to liberate the material contained in them. Starch solutions capable of acting as auxiliary agents in our process may be prepared in various ways. We have discovered, for example, that such solutions may be produced by boiling in water an ordinary starch of commerce, such as potato starch, rice starch, corn starch, cassava (tapioca) and wheat starch; or by boiling the starch in a dilute solution of caustic alkali in water; or by agitating the starch with water and adding an aqueous solution of caustic alkali until the mixture becomes gelatinous; or by grinding the starch with water in a ball mill or other apparatus. However, other treatments of starch, which rupture the granules thereof and liberate their contents, may be used in preparing the auxiliary agent which we have found useful in the concentration of sylvinite ores by froth-flotation and agglomeration tabling operations.

In practicing the methods of the present invention, desliming of the sylvinite ore is desirable; and it is also generally desirable to add a frothing agent, such as pine oil, in addition to the auxiliary agent and the collecting agent, when the desired mineral is to be concentrated by froth-flotation. The collecting agent may be any suitable nitrogenous cationic agent, for example, an aliphatic amine such as octadecylamine acetate or a lauryl amine hydro-chloride, as mentioned in the examples hereinafter given.

The following examples giving the results obtained in concentrating sylvite, without and with the use of a suitably prepared starch solution as an auxiliary agent in conjunction with a cationic collector, illustrate the advantages obtained by employing the methods of the present invention; but the invention is not to be construed as being limited to the details of the methods hereinafter described.

Methods employing as the auxiliary collecting agent "causticized starch" will first be described. By "causticized starch" is meant an aqueous solution of starch and caustic alkali such as sodium or potassium hydroxide.

Such causticized starch solution may be conveniently prepared by boiling a dilute solution of caustic alkali to which solid starch has been added. We have found that it is not always necessary to boil the solution because we have been able to obtain excellent results with a mixture prepared by adding a solution of caustic alkali to a suspension of starch in cold water and stirring the mixture until it becomes gelatinous, as will appear from Example III which follows. The amount of the auxiliary reagent required, in terms of solid starch and caustic alkali, is considerably less than 1% (20 lbs. to the ton) of the weight of the ore, and we have obtained very good results with amounts corresponding to from 1.0 to 4.0 lbs. of solid starch and alkali per ton of ore although the exact amount of causticized starch required will vary somewhat according to the nature of the ore. The proportion of caustic alkali to starch in the auxiliary collecting agent may vary, but we have found that one part of alkali to five of starch gives a solution easy to handle and very effective in practice.

Whatever the reasons may be, we have discovered that it is a fact that when such a causticized starch solution is added to a pulp of sylvinite ore, prepared by adding the ore to be treated to a saturated aqueous solution of its soluble constituents, together with suitable collecting agents, a concentrate of improved grade or a higher percentage of recovery or both results. Desliming of the sylvinite ore is desirable, and it may be necessary in some cases to add a frothing agent in addition to the collecting agents.

The following contrasting examples, giving the results obtained with and without the use of causticized starch illustrate the advantages obtained by employing causticized starch as an auxiliary collecting agent with a suitable collecting agent such as octadecylamine acetate or a lauryl amine hydro-chloride. The octadecylamine acetate referred to in the following examples was the commercial product of Armour and Company, sold under the designation "Am. Ac. 1180—C," which is understood to consist principally of mono-octadecylamine acetate and a small portion of mono-hexadecylamine acetate.

EXAMPLE I.—Sylvinite ore obtained from Carlsbad, New Mexico, was crushed so that it would pass through a 10-mesh screen, and was then deslimed and ground so that it would pass through a 48-mesh screen, after which it was made into a pulp of about 20% solids with a saturated solution of ore constituents. Reagents, as specified hereafter, were added to this pulp, the pulp was agitated about 10 seconds to distribute the reagents and flotation was then effected. The first or rougher froth concentrate was returned to the flotation machine, diluted and refloated. This was repeated on the second froth concentrate. The reject of the first flotation operation was final tailings. Rejects of second and third flotation operations were middlings to be returned to the flotation circuit and further values recovered therefrom. The reagents used were octadecylamine acetate 1.00 lb., and pine oil 0.12 lb., both to the ton of ore treated. Results were as follows:

| Product | Weight | KCl | KCl recovery |
| --- | --- | --- | --- |
| | Percent | Percent | Percent |
| Feed | 100.0 | 20.56 | 100.0 |
| Concentrate | 17.4 | 95.31 | 80.6 |
| Midd 2 | 1.9 | 65.28 | 6.0 |
| Midd 1 | 4.7 | 13.51 | 3.1 |
| Tailing | 71.9 | 2.24 | 7.8 |
| Slime | 4.1 | 12.24 | 2.5 |

EXAMPLE II.—This operation was identical with Example I, except that causticized starch was employed. This was prepared by adding 5 parts of starch and 1 part of caustic soda to 500 parts of water by weight, and boiling 2 minutes. The cooled solution was then employed in flotation according to the procedure of Example I, using 1.00 lb. of causticized starch (dissolved solids) with the amounts of octadecylamine acetate and pine oil used in Example I. Results were as follows:

| Product | Weight | KCl | KCl recovery |
| --- | --- | --- | --- |
| | Percent | Percent | Percent |
| Feed | 100.0 | 21.10 | 100.0 |
| Concentrate | 20.0 | 94.21 | 89.1 |
| Midd 2 | 0.9 | 20.97 | 1.0 |
| Midd 1 | 6.7 | 4.14 | 1.4 |
| Tailing | 68.5 | 2.11 | 6.8 |
| Slime | 3.9 | 9.00 | 1.7 |

It will be noted that although the grade of concentrate was slightly lower than in Example I an increased recovery of 8.5% was obtained by the use of causticized starch.

EXAMPLE III.—This operation illustrates the use of a causticized starch solution, made without boiling, as follows: 50 parts of cream corn starch obtained from the A. E. Staley Manufacturing Co. were added to 900 parts of water by weight, and distributed by agitation; and 10 parts of caustic soda dissolved in 100 parts of water by weight, were added slowly to the starch suspension while agitating and the agitation was continued for a short time after the suspension became gelatinous. The solution was then diluted so that it contained 1% starch and 0.2% caustic soda. Sylvinite ore from Carlsbad, New Mexico, was crushed to 10-mesh, deslimed, ground to 35-mesh and made into a pulp of 20% solids with a saturated aqueous solution of its soluble constituents. To the pulp were added: Causticized starch 1.00 lb. (0.83 lb. starch 0.17 lb. caustic) octadecylamine acetate 1.00 lb. and pine oil 0.24 lb., all per ton of ore. After a brief conditioning period, a froth concentrate of sylvite was removed and this concentrate was twice retreated without the further addition of reagents, with the results shown in the following table:

| Product | Weight | KCl | KCl recovery |
| --- | --- | --- | --- |
| | Percent | Percent | Percent |
| Feed | 100.0 | 26.9 | 100.0 |
| Concentrate | 24.1 | 96.0 | 86.1 |
| Midd 2 | 0.6 | 57.7 | 1.3 |
| Midd 1 | 2.2 | 12.1 | 1.0 |
| Tailing | 68.5 | 3.3 | 8.7 |
| Slime | 4.6 | 16.9 | 2.9 |

Thus, from an ore containing 26.9% potassium chloride there was obtained a concentrate of potassium chloride assaying 96.0%, with 86.1% recovery.

EXAMPLE IV.—This operation was performed in exactly the same manner as that of Example III, except that no causticized starch was used, and gave the following poorer results:

| Product | Weight | KCl | KCl recovery |
| --- | --- | --- | --- |
| | Percent | Percent | Percent |
| Feed | 100.0 | 27.1 | 100.0 |
| Concentrate | 22.5 | 92.1 | 76.6 |
| Midd 2 | 2.4 | 79.7 | 7.1 |
| Midd 1 | 4.2 | 26.9 | 4.2 |
| Tailing | 66.4 | 3.6 | 8.9 |
| Slime | 4.5 | 19.3 | 3.2 |

A comparison of Examples III and IV shows the very considerable improvement in both grade and recovery brought about by the use of causticized starch.

EXAMPLE V.—This gives the results of another operation on sylvinite ore in which a different cationic reagent is used, viz., the commercial product of E. I. Du Pont de Nemours & Company, Inc., sold under the designation "D. P. 243," which is a technical lauryl amine hydrochloride containing approximately 18% octyl amine hydrochloride, 10% n-decyl amine hydrochloride, 55% lauryl amine hydrochloride, and 17% myristyl amine hydrochloride. As before, the sylvinite ore was crushed to minus 10-mesh, deslimed, ground to minus 35-mesh, and made into a pulp with a saturated aqueous solution of the soluble constituents of the ore. Reagents were added as follows: D. P. 243, 1.00 lb., and pine oil 0.24 lb., both per ton of ore. A froth concentrate of sylvite was removed and retreated twice without adding any further reagents, with results as follows:

| Product | Weight | KCl | KCl recovery |
|---|---|---|---|
|  | Percent | Percent | Percent |
| Feed | 100.0 | 28.4 | 100.0 |
| Concentrate | 19.3 | 93.8 | 63.8 |
| Midd 2 | 4.8 | 86.3 | 14.6 |
| Midd 1 | 8.9 | 41.5 | 13.6 |
| Tailing | 64.6 | 3.5 | 8.0 |
| Slime | 2.4 | 6.9 | 0.6 |

It will be noted that the recovery was only 63.8% of the potassium chloride in the ore.

EXAMPLE VI.—This operation was carried out in exactly the same way as Example V, except that, in addition to the other reagents, causticized starch solution was added in an amount equal to 0.83 lb. starch and 0.17 lb. caustic soda, both per ton of ore. The results appear in the following table:

| Product | Weight | KCl | KCl recovery |
|---|---|---|---|
|  | Percent | Percent | Percent |
| Feed | 100.0 | 29.4 | 100.0 |
| Concentrate | 22.5 | 95.1 | 72.8 |
| Midd 2 | 1.9 | 83.3 | 5.4 |
| Midd 1 | 5.4 | 43.5 | 8.0 |
| Tailing | 67.0 | 5.3 | 12.6 |
| Slime | 3.2 | 17.2 | 1.8 |

While the results of Examples V and VI are not as good as those of Examples III and IV, the considerable improvement in grade and recovery by the use of causticized starch will be noted.

The improvement in grade and recovery due to the use of causticized starch in the concentration of sylvite (KCl) is well shown by comparison of two actual plant operations on sylvinite ore from Carlsbad, New Mexico, the feed in said operations containing minor amounts of slime. In a first period of 16 days, 7,780 tons of sylvinite were treated. The reagent used was octadecylamine acetate, 1.50 lbs. per ton of ore; and the average grade of concentrate produced was 90.48% KCl with an average recovery of 73.9% from a feed containing 30.80% KCl. In a second period of 16 days, using the same flotation cells, 12,341 tons of sylvinite were treated. The reagents used were octadecylamine acetate 0.75 lb., and causticized starch 2.5 lbs., both per ton of ore; and the average grade of concentrate obtained was 95.80% KCl with a recovery of 77.8% from a feed containing 30.21% KCl. Besides the improved grade of concentrate and recovery obtained by the use of causticized starch, it will be noted that the amount of octadecylamine acetate required in the second period was very much less. In addition, the causticized starch produced greatly improved operating conditions and a better and more easily controlled froth, thus enabling a very much larger tonnage of ore to be treated in the same time.

The following Examples VII, VIII and IX show that a boiled starch solution, instead of causticized starch, may be used to advantage as an auxiliary agent with a suitable collecting agent in froth-flotation concentration of potash minerals. In each of these examples, octadecylamine acetate was used as the collecting agent in the amount of 1.5 lbs., and pine oil was used as a frothing agent in the amount of 0.3 lb., both per ton of solids in the feed. In Example VII no starch was used. In both Examples VIII and IX boiled starch solution was used in the amount of 0.83 lb. per ton of solids in the feed; but in Example VIII the strength of the starch solution was 1% whereas in Example IX it was 3%. These boiled starch solutions were made by boiling cream corn starch with water for about 10 minutes. In these Examples VII, VIII and IX sylvinite ore obtained from the Carlsbad district of New Mexico was ground to −10 mesh, agitated in an aqueous solution and deslimed; and then ground to −35 mesh to provide the feed. This feed was mixed with a saturated aqueous solution of the soluble constituents of the ore to form a pulp having about 20% solids; and after addition of the agents this pulp was briefly agitated to condition it, and thereafter subjected to flotation treatment.

EXAMPLE VII.—*No starch.*—The results of this operation, which was for comparative purposes, were as follows:

| Product | Weight | KCl | KCl recovery |
|---|---|---|---|
|  | Percent | Percent | Percent |
| Feed | 100.0 | 30.3 | 100.0 |
| Concentrate | 21.7 | 87.8 | 62.8 |
| Midd 2 | 5.9 | 78.6 | 15.2 |
| Midd 1 | 9.3 | 31.5 | 9.9 |
| Tailing | 59.5 | 5.4 | 10.5 |
| Slime | 3.6 | 14.6 | 1.6 |

EXAMPLE VIII.—*With 1% boiled starch solution.*—This operation was carried out in the same manner and with the same agents as Example VII except for the fact that a 1% starch solution in the amount of 0.83 lb. starch per ton of solids in the feed was used as an auxiliary agent. The results were as follows:

| Product | Weight | KCl | KCl recovery |
|---|---|---|---|
|  | Percent | Percent | Percent |
| Feed | 100.0 | 31.9 | 100.0 |
| Concentrate | 25.7 | 94.7 | 76.3 |
| Midd 2 | 2.2 | 85.0 | 5.9 |
| Midd 1 | 4.1 | 38.2 | 4.9 |
| Tailing | 63.2 | 4.6 | 9.2 |
| Slime | 4.8 | 25.5 | 3.7 |

It will be noted that the results in Example VIII were substantially better than in Example VII, from the standpoints of both grade and recovery of concentrate.

EXAMPLE IX.—*With 3% boiled starch solution.*—This operation was carried out in the same manner as Example VIII, except for the fact that the 3% (instead of a 1%) starch solution was used. The results were as follows:

| Product | Weight | KCl | KCl recovery |
|---|---|---|---|
|  | Percent | Percent | Percent |
| Feed | 100.0 | 30.1 | 100.0 |
| Concentrate | 28.1 | 95.4 | 89.2 |
| Midd 2 | 0.7 | 59.0 | 1.4 |
| Midd 1 | 2.9 | 14.3 | 1.4 |
| Tailing | 63.9 | 2.9 | 6.0 |
| Slime | 4.4 | 14.3 | 2.0 |

It will be noted that the results in Example IX, from the standpoints of both grade and recovery of concentrate, were considerably better than the results in Example VIII.

EXAMPLE X.—*With ground starch solution.*—In this operation, instead of boiled starch, there was used a 6% solution of starch in water which was subjected to grinding in a pebble mill for about 18 hours. The amount of starch used was 0.83 lb. per ton of solids in the feed and the other reagents were as in Examples VII–IX. The results of this operation were as follows:

| Product | Weight | KCl | KCl recovery |
|---|---|---|---|
|  | Percent | Percent | Percent |
| Feed | 100.0 | 29.6 | 100.0 |
| Concentrate | 27.0 | 94.3 | 86.0 |
| Midd 2 | 1.5 | 79.0 | 4.0 |
| Midd 1 | 3.6 | 19.4 | 2.4 |
| Tailing | 64.0 | 3.0 | 6.5 |
| Slime | 3.9 | 8.4 | 1.1 |

It will be noted that this operation resulted in a high grade and satisfactory recovery of concentrate.

The excellent results obtainable by the use of a boiled starch solution as an auxiliary agent in conjunction with a cationic collector, for the concentration of sylvite from sylvinite ore, will be apparent from the following description of actual plant froth-flotation operations on a sylvinite ore at Carlsbad, New Mexico. The sylvinite ore after being crushed to about −10-mesh was deslimed and then ground to about −35-mesh. This feed, in a pulp formed with a saturated solution of the ore constituents, was conditioned with the following reagents: octadecylamine acetate in the amount of .35 lb., pine oil in the amount of .27 lb., and a starch solution made by boiling pearl corn starch (product of Corn Products Refining Company) with water, equivalent to 1.338 lbs. of starch, each per ton (2000 lbs.) of solids in the feed. The following table gives the significant data for a 24 hours operation of the plant:

| Product | Tons | KCl | KCl recovery |
|---|---|---|---|
|  |  | Percent | Percent |
| Feed | 1461.55 | 32.56 | 100.00 |
| Conc | 447.05 | 95.93 | 90.11 |
| Tails | 1014.50 | 4.61 | 9.89 |

It will be noted that the concentration of KCl was highly satisfactory from the standpoints of both grade and recovery; and that the total amount of agents used was considerably less than 1% of the solids in the feed.

The following Examples XI to XIV show the usefulness of the invention in connection with the concentration of sylvite by agglomeration tabling operations. In all of these examples, the feed was a sylvinite ore from Carlsbad, New Mexico, which was reduced to particle sizes ranging from about minus 6 to plus 35 mesh, which was partially deslimed. In tests XI and XIII no starch solution was employed; whereas in tests XII and XIV there was employed with the agglomeration agents, as an auxiliary agent, a starch solution made by boiling a 3% solution of Staley's corn starch in water for about 15 minutes. In each of these examples, the pulp was formed with a saturated aqueous solution of the soluble constituents of the ore and was conditioned with the reagents for about 1 minute at about 70% solids, whereupon the conditioned pulp was diluted and fed to the shaking table with a saturated aqueous solution of the soluble constituents of the ore. In all of the examples, the desired potash minerals were recovered at the side of the table, and the rejected constituents went off at the end of the table. The kinds and quantities of the various reagents are mentioned in the following descriptions of Examples XI to XIV.

EXAMPLE XI.—In this example, no starch solution was employed. The agglomerating agents were octadecylamine acetate in the amount of 1.0 lb. and fuel oil in the amount of 4.1 lbs., both per ton of solids in the feed. The results were as follows:

| Product | Weight | KCl | KCl recovery |
|---|---|---|---|
|  | Percent | Percent | Percent |
| Feed | 100.0 | 31.1 | 100.0 |
| Conc | 35.7 | 80.8 | 92.9 |
| Midd | 1.9 | 4.4 | 0.5 |
| Tail | 61.4 | 3.0 | 6.1 |
| Slime | 1.0 | 11.3 | 0.5 |

EXAMPLE XII.—In this example, the kinds and amounts of agglomerating agents were the same as in Example XI; but with them was used, as an auxiliary agent, the boiled starch solution in the amount of 1.0 lb. starch per ton of solids in the feed. The results were as follows:

| Product | Weight | KCl | KCl recovery |
|---|---|---|---|
|  | Percent | Percent | Percent |
| Feed | 100.0 | 30.6 | 100.0 |
| Conc | 34.3 | 84.8 | 95.4 |
| Midd | 2.0 | 10.3 | 0.5 |
| Tail | 62.5 | 1.7 | 3.6 |
| Slime | 1.2 | 12.5 | 0.5 |

Comparison of Examples XI and XII shows that the addition of the boiled starch solution resulted in improvements in both grade and recovery of the potassium chloride concentrate.

Example XIII.—In this example, as in Example XI, no starch solution was used. The agglomerating agent was octadecylamine acetate alone, in the amount of 0.5 lb. per ton of solids in the feed. The results were as follows:

| Product | Weight | KCl | KCl recovery |
|---|---|---|---|
|  | Percent | Percent | Percent |
| Feed | 100.0 | 29.5 | 100.0 |
| Conc | 19.3 | 96.5 | 63.4 |
| Midd | 5.8 | 87.8 | 17.2 |
| Tail | 73.8 | 7.4 | 18.8 |
| Slime | 1.1 | 9.8 | 0.6 |

Example XIV.—In this example, the kind and amount of agglomerating agent were the same as Example XIII. In addition, as an auxiliary agent, the boiled starch solution was used in the amount of 1.0 lb. starch per ton of solids in the feed. The results were as follows:

| Product | Weight | KCl | KCl recovery |
|---|---|---|---|
|  | Percent | Percent | Percent |
| Feed | 100.0 | 30.1 | 100.0 |
| Conc | 27.5 | 92.6 | 84.7 |
| Midd | 2.7 | 75.8 | 6.9 |
| Tail | 68.8 | 3.5 | 7.9 |
| Slime | 1.0 | 8.2 | 0.5 |

It will be noted, from a comparison of Examples XIII and XIV, that the addition of the boiled starch solution resulted in a very substantial increase of recovery, although the grade of the potassium chloride concentrate was slightly decreased.

As indicated in the foregoing examples, the reagents, including the collector and the auxiliary agent or starch, were added separately to the pump.

It is to be understood that the foregoing examples are merely illustrative of the present invention and that, within the scope of the appended claims, the invention may be practiced otherwise than as specifically illustrated and described.

What is claimed is:

1. The improvement in the method of concentrating sylvite from a sylvinite ore in a pulp formed with a saturated aqueous solution of the soluble ore constituents and conditioned with a collector selected from the group consisting of the aliphatic amines containing a straight chain alkyl group having from 8 to 18 carbon atoms and their salts with water-soluble acids, which resides in distributing in said pulp a useful amount of an auxiliary agent consisting of the liberated contents of starch grains, and thereafter subjecting the pulp to separation treatment to remove the desired sylvite.

2. A method as set forth in claim 1, wherein the sylvinite ore is deslimed before the collector and auxiliary agent are added.

3. A method as set forth in claim 1, wherein the separation treatment is a froth-flotation treatment in a froth-flotation machine.

4. A method as set forth in claim 1, wherein the separation treatment is an agglomeration tabling treatment.

5. A method as set forth in claim 1, wherein the auxiliary agent is a solution of causticized starch.

6. A method as set forth in claim 1, wherein the auxiliary agent is a solution of amylose.

7. A method as set forth in claim 1, wherein the contents of the starch grains have been liberated by boiling the starch in a solution of caustic alkali in water.

8. A method as set forth in claim 1, wherein the contents of the starch grains have been liberated by agitating the starch with water and adding an aqueous solution of caustic alkali until the mixture becomes gelatinous.

9. A method as set forth in claim 1, wherein the auxiliary agent is a boiled solution of starch in water.

10. A method as set forth in claim 1, wherein the contents of the starch grains have been liberated by boiling the starch with water.

11. A method as set forth in claim 1, wherein the auxiliary agent is a ground solution of starch in water.

12. A method as set forth in claim 1, wherein the contents of the starch grains have been liberated by grinding the starch with water.

13. A method of concentrating sylvite from sylvinite ore comprising crushing and desliming the ore, grinding the deslimed ore to suitable particle size and mixing it with a saturated aqueous solution of the soluble constituents of the ore to form a pulp, adding to and mixing with said pulp agents in the total amount of less than 1% of the solids in the feed, said agents comprising octadecylamine acetate, a suitable frothing agent and a useful amount of a boiled starch solution, and subjecting the thus conditioned pulp to froth-flotation treatment to remove the sylvite.

14. A method of concentrating sylvite from sylvinite ore comprising crushing and desliming the ore, grinding the deslimed ore to suitable particle size and mixing it with a saturated aqueous solution of the soluble constituents of the ore to form a pulp, adding to and mixing with said pulp agents in the total amount of less than 1% of the solids in the feed, said agents comprising octadecylamine acetate, a mineral oil and a useful amount of a boiled starch solution, and subjecting the thus conditioned pulp to agglomeration tabling treatment to remove the sylvite.

15. A method of concentrating sylvite from sylvinite ore comprising crushing and desliming the ore, grinding the deslimed ore to suitable particle size and mixing it with a saturated aqueous solution of the soluble constituents of the ore to form a pulp, adding to and mixing with said pulp agents in the total amount of less than 1% of the solids in the feed, said agents comprising octadecylamine acetate and a useful amount of a boiled starch solution, and subjecting the thus conditioned pulp to agglomeration tabling treatment to remove the sylvite.

16. A method of concentrating sylvite from sylvinite ore comprising crushing and desliming the ore, grinding the deslimed ore to suitable particle size and mixing it with a saturated aqueous solution of the soluble constituents of the ore to form a pulp, adding to and mixing with said pulp agents in the total amount of less than 1% of the solids in the feed, said agents comprising lauryl amine hydrochloride, a suitable frothing agent and a useful amount of a boiled starch solution, and subjecting the thus conditioned pulp to froth flotation treatment to remove the sylvite.

FRANCIS X. TARTARON.
ALLEN T. COLE.
JAMES B. DUKE.